United States Patent
Sasmal

(10) Patent No.: US 12,509,040 B2
(45) Date of Patent: Dec. 30, 2025

(54) SYSTEM AND METHOD FOR IMPLEMENTING MAXIMUM BRAKING PRESSURE IN TRACTOR-TRAILERS

(71) Applicant: KB Intellectual Property GmbH & Co. KG, Pullach (DE)

(72) Inventor: Subashish Sasmal, Avon, OH (US)

(73) Assignee: KB Intellectual Property GmbH & Co. KG, Munich (DE)

( * ) Notice: Subject to any disclaimer, the term of this patent is extended or adjusted under 35 U.S.C. 154(b) by 22 days.

(21) Appl. No.: 18/753,463

(22) Filed: Jun. 25, 2024

(65) Prior Publication Data
US 2025/0388199 A1  Dec. 25, 2025

(51) Int. Cl.
| | |
|---|---|
| B60T 8/32 | (2006.01) |
| B60T 7/12 | (2006.01) |
| B60T 8/17 | (2006.01) |
| B60T 8/171 | (2006.01) |
| B60T 8/172 | (2006.01) |
| B60T 8/1761 | (2006.01) |
| B60T 8/86 | (2006.01) |

(52) U.S. Cl.
CPC .............. B60T 8/323 (2013.01); B60T 7/12 (2013.01); B60T 8/1708 (2013.01); B60T 8/171 (2013.01); B60T 8/172 (2013.01); B60T 8/17616 (2013.01); B60T 8/86 (2013.01)

(58) Field of Classification Search
CPC ........ B60T 8/323; B60T 8/1708; B60T 8/171; B60T 8/172; B60T 8/17616; B60T 8/86; B60T 7/12
USPC ......................................... 701/70, 78, 81, 83
See application file for complete search history.

(56) References Cited

U.S. PATENT DOCUMENTS

| | | | |
|---|---|---|---|
| 7,016,783 B2 | 3/2006 | Hac et al. | |
| 7,226,134 B2 | 6/2007 | Horn et al. | |
| (Continued) | | | |

FOREIGN PATENT DOCUMENTS

| | | |
|---|---|---|
| CN | 110435623 B | 5/2020 |
| CN | 111907492 A | 11/2020 |
| (Continued) | | |

OTHER PUBLICATIONS

International Search Report mailed Sep. 9, 2025 for International Application No. PCT/EP2025/063892.
(Continued)

*Primary Examiner* — Hai H Huynh
(74) *Attorney, Agent, or Firm* — Crowell & Moring LLP

(57) ABSTRACT

A method and system for providing maximum trailer braking during a high pressure demand, such as during autonomous emergency braking (AEB), for tractor-trailers is provided. The system can include a brake controller of the trailer that uses only tractor anti-lock brake system (ABS) data from the tractor wheels, without using any trailer ABS information, to estimate the surface friction and generate a high or low pressure command to be sent to the trailer based on only the tractor ABS data. The estimation of surface friction may be accomplished using the ABS information from the tractor and the pressure being demanded to determine a percent reduction of pressure requested by the tractor that may be compared to a threshold percentage to differentiate between high and low mu surfaces in real time.

20 Claims, 3 Drawing Sheets

(56) References Cited

U.S. PATENT DOCUMENTS

| | | |
|---|---|---|
| 10,266,161 B2 | 4/2019 | Odate |
| 10,589,728 B2 | 3/2020 | Miller, Jr. et al. |
| 2004/0119334 A1 | 6/2004 | Lenz et al. |
| 2014/0046566 A1 | 2/2014 | Maitlen |
| 2022/0289198 A1 | 9/2022 | Schmitt |
| 2024/0092329 A1 | 3/2024 | Kirmaier et al. |

FOREIGN PATENT DOCUMENTS

| | | | | |
|---|---|---|---|---|
| CN | 112172762 A | | 1/2021 | |
| CN | 116620231 A | | 8/2023 | |
| CN | 117261840 A | | 12/2023 | |
| JP | 2002510257 A | * | 4/2002 | ............ B60T 13/683 |
| WO | WO 2020/023660 A1 | | 1/2020 | |

OTHER PUBLICATIONS

Written Opinion mailed Sep. 9, 2025 for International Application No. PCT/EP2025/063892.

* cited by examiner

SYSTEM AND METHOD FOR IMPLEMENTING MAXIMUM BRAKING PRESSURE IN TRACTOR-TRAILERS

BACKGROUND

Vehicles, including tractor-trailers, increasingly employ advanced driver assistance systems (ADAS) that assume control, or supplement operator control, of various vehicle systems based on conditions associated with the vehicle, the road surface, and objects that surround the vehicle including pedestrians, other vehicles and road infrastructure. Exemplary systems include adaptive cruise control systems, anti-lock braking systems (ABS), and collision avoidance systems including, for example, blind spot monitoring, lane departure warning and lane change assist systems. Another conventional system is referred to as automated emergency braking (AEB) and may be implemented as a stand-alone system or as a function of one of the systems mentioned above. In AEB, emergency braking is implemented when certain conditions are detected in order to slow or stop movement of the vehicle. When conditions are detected that require braking, a controller generates one or more commands causing application of the vehicle wheel brakes. In tractor-trailers, it is important that the stability of each trailer is maintained during emergency braking. Anti-lock braking systems on a trailer can be used to help maintain the stability of the trailer. The AEB system controller, however, is typically located on the tractor and does not always know whether or not the trailers have fully operational ABS—particularly where the tractor is coupled to multiple trailers. As a result, the AEB system will frequently modulate (pulse) delivery of fluid pressure to the trailer wheel brakes in order to insure the stability of the trailer during braking. Modulating delivery of fluid pressure, however, reduces the braking force and increases the stopping distance for the tractor-trailer.

Also, power line communication (PLC), a communication method employed by some tractor-trailers in which data is transmitted over wires that are also used to deliver electric power to exchange messages between members of the tractor-trailer including, for example, sensor readings from vehicle systems including anti-lock braking systems (ABS), collision avoidance systems, tire pressure monitoring systems, and other vehicle systems, as well as commands used to control anti-lock braking systems, lighting systems, and other vehicle systems, may impose certain limitations. In North America, trailer ABS status of each towed unit in a combination vehicle with multiple towed units may not be determined reliably, due to limitations of PLC. As a result, external automated braking systems like an autonomous emergency braking (AEB) system, may not request maximum possible trailer braking, due to risk of trailer swing on low friction surfaces, when one or more towed units don't have trailer ABS.

SUMMARY

Figure 1:
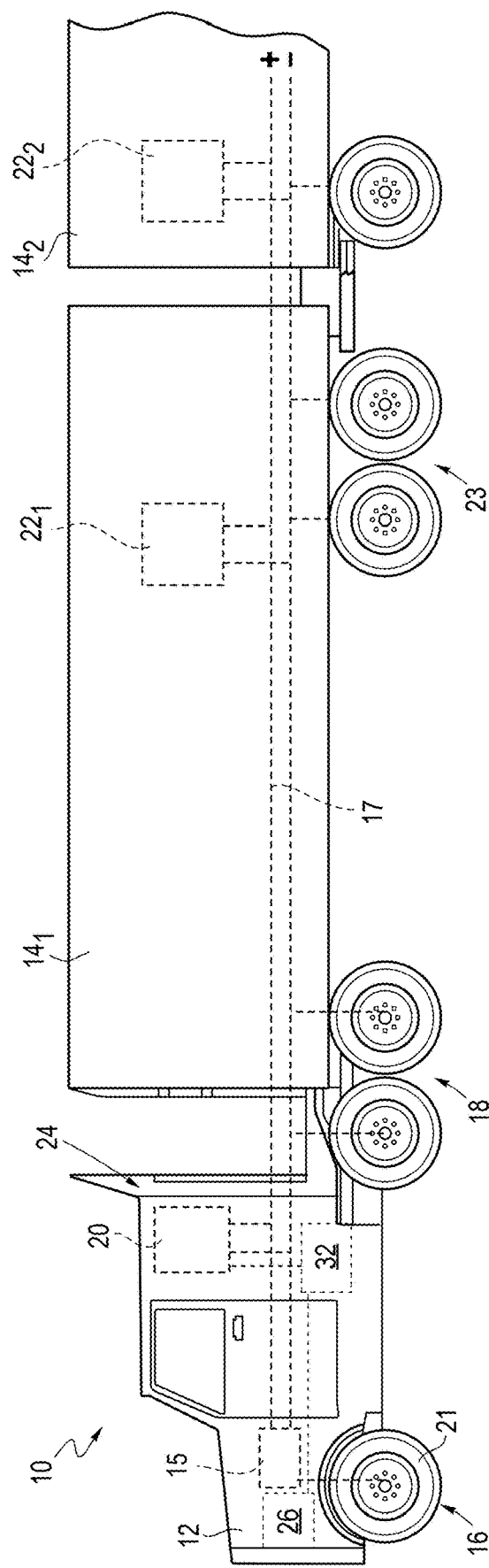
FIG. 1 is a diagrammatic view of a tractor-trailer incorporating a system for controlling wheel brakes on the trailer in accordance with one embodiment of the present teachings.

In order to improve the braking capability of a tractor-trailer vehicle when an automated braking system requests a braking action, a system and method for improving braking function is described herein.

According to one aspect, a brake system in a tractor includes a brake controller that is configured to receive a deceleration demand from an automated system of the tractor and determine a pressure demand for all wheel-ends of the tractor. When the received deceleration demand is greater than or equal to a deceleration demand threshold or the determined pressure demand is greater than or equal to a predetermined pressure demand threshold, the brake controller is configured to determine a pressure applied at each wheel-end of the tractor and calculate a pressure reduction percentage at each wheel-end of the tractor. The brake controller is configured to, when a maximum calculated pressure reduction is less than a predetermined pressure reduction threshold, generate a first control signal to cause delivery of high fluid pressure to wheel brakes of a trailer to the tractor. Additionally, the brake controller is configured to, when the maximum calculated pressure reduction is greater than or equal to the predetermined pressure reduction threshold, generate a second control signal to cause delivery of low fluid pressure to wheel brakes of the trailer to the tractor.

In another aspect, a method is provided that is performed in a tractor brake system that includes a brake controller. The method includes the brake controller: receiving a deceleration demand from an automated system of the tractor; determining a pressure demand for all wheel-ends of the tractor; when the received deceleration demand is greater than or equal to a deceleration demand threshold or the determined pressure demand is greater than or equal to than a predetermined pressure demand threshold: determining a pressure applied at each wheel-end of the tractor and calculating a pressure reduction percentage at each wheel-end of the tractor; when a maximum calculated pressure reduction is less than a predetermined pressure reduction threshold: generating a first control signal to cause delivery of high fluid pressure to wheel brakes of a trailer to the tractor; and when the maximum calculated pressure reduction is greater than or equal to the predetermined pressure reduction threshold: generating a second control signal to cause delivery of low fluid pressure to wheel brakes of the trailer to the tractor.

In yet another aspect, a non-transitory computer readable medium contains processor executable instructions for causing a tractor brake controller to: receive a deceleration demand from an automated system of the tractor; determine a pressure demand for all wheel-ends of the tractor; when the received deceleration demand is greater than or equal to a deceleration demand threshold or the determined pressure demand is greater than or equal to a predetermined pressure demand threshold: determine a pressure applied at each wheel-end of the tractor and calculate a pressure reduction percentage at each wheel-end of the tractor; when a maximum calculated pressure reduction is less than a predetermined pressure reduction threshold: generate a first control signal to cause delivery of high fluid pressure to wheel brakes of a trailer to the tractor; and when the maximum calculated pressure reduction is greater than or equal to the predetermined pressure reduction threshold: generate a second control signal to cause delivery of low fluid pressure to wheel brakes of the trailer to the tractor.

Other embodiments are possible, and each of the embodiments may be used alone or together in combination.

DETAILED DESCRIPTION

In order to utilize the maximum possible trailer braking on high-mu surfaces (i.e., high friction surfaces, also referred to herein as high-µ surfaces), a system and method are disclosed herein to provide a means of detecting low-mu surfaces (i.e., low friction surfaces, also referred to herein as low-µ surfaces), and hence mitigating trailer swing on low-mu surfaces, during autonomous emergency braking (AEB) events, without the need to know trailer ABS information and without the need to estimate or measure vehicle speed. As described in greater detail below, the system and method utilizes real-time information from only the tractor of a tractor-trailer to determine whether a brake pressure applied to trailer brakes during an AEB event should be tailored for a high-µ surface (i.e., a high brake pressure applied to the trailer wheels), or a for a low-µ surface (i.e., a lower brake pressure where pulsed braking is applied to the trailer wheels). This capability can help enable the ability to achieve higher-speed reductions during AEB, for example for a speed on the order of 70 miles per hour (MPH), compared to current state-of-art 50 MPH globally.

Turning now to the drawings, FIG. 1 illustrates a vehicle of an embodiment; in particular, a tractor-trailer 10. The tractor-trailer 10 contains a truck or tractor 12 and one or more trailers $14_1 \ldots 14_N$. In this embodiment, the tractor 12 contains a power unit, such as an internal combustion engine, and steering and drive axles. The tractor 12 also contains a battery 15 for use in starting the power unit and in providing power to various accessory systems. Trailers $14_1 \ldots 14_N$ are provided to store freight and are detachably coupled to the tractor 12. Although a pair of trailers 14 is shown in the illustrated embodiment, it should be understood that fewer or more trailers can be used. In one example, up to five total trailers can be used. In other examples, a different number of trailers can be used.

The tractor 12 and the trailers 14 may include various fluid (e.g., air) and power lines that extend between the tractor 12 and the trailers 14, including power line 17. The fluid and power lines allow delivery of fluids and electrical power from the tractor 12 to the trailers 14 for use in, for example, tire pressure management, braking, and activation of tail lights on the trailer 14. The power line 17 is also used for power line communication (PLC) to transmit data over wires that are also used to deliver electric power. The data is encoded within a signal that is transmitted over the wires in frequency ranges outside of those used to transmit electric power.

In this example, the power line 17 forms part of a network used to transmit communications between various brake controllers 20, $22_1 \ldots 22_N$ on the tractor 12 and the trailers 14, respectively. As used herein, a brake controller (sometimes referred to herein as an electronic control unit (ECU)) can comprise one or more processors that can execute computer-readable program code having instructions (e.g., modules, routines, sub-routine, programs, applications, etc.) that, when executed by the one or more processors, individually or in combination, cause the one or more processors to perform certain functions, such as some or all of those discussed herein. The computer-readable program code can be stored in a non-transitory computer-readable storage medium, such as, but not limited to, volatile or non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof. The one or more processors can also take the form of a purely-hardware implementation (e.g., an application-specific integrated circuit (ASIC)). In one embodiment, one or more of the brake controllers provide antilock braking system (ABS) and/or electronic braking system (EBS) functionality.

Although not shown in FIG. 1 to simplify the drawings, other systems can also be connected to the power line 17. Such systems include, but are not limited to, collision avoidance systems, tire pressure monitoring and control systems, trailer load monitoring systems, and lighting systems.

The power line 17 may enable transmission of data from one or more brake controllers 22 on the trailers 14 to the brake controller 20 on the tractor 12 including, for example, sensor readings indicative of the operation of an anti-lock braking system. The power line 17 may also enable transmission of commands and data from the tractor 12 to the trailers 14 for use in controlling elements of the anti-lock braking system, for example.

Tractor-trailer 10 may further include one or more advanced driver assistance systems 24 configured to implement automated emergency braking (AEB) of wheels 16 under certain conditions. System 24 may comprise, for example, a collision avoidance system and may include one or more sensors 26, a controller 28 and an operator interface that communicate with one another over a conventional vehicle communication bus such as a controller area network (CAN).

Tractor-trailer 10 further includes a braking system 32 configured to brakes wheels 21 on tractor 12 and trailers 14 in order to slow or stop movement of tractor-trailer 10. As discussed in greater detail below, system 32 may include components on both tractor 12 and trailer 14 that may be in fluid and/or electrical communication using conventional connectors between tractor 12 and trailer 14. In accordance with the present teachings, system 32 may communicate with system 24 over the power line communication (PLC) network carried on power lines 17 on tractor-trailer 10 (or another conventional communications medium such as a controller area network (CAN)). In particular, system 32 may be configured to brake wheels 21 in response to a braking command generated by controller 28 of system 24 whenever controller 28 determines that automated emergency braking is required based on signals generated by sensors 26 in system 24.

Figure 2:
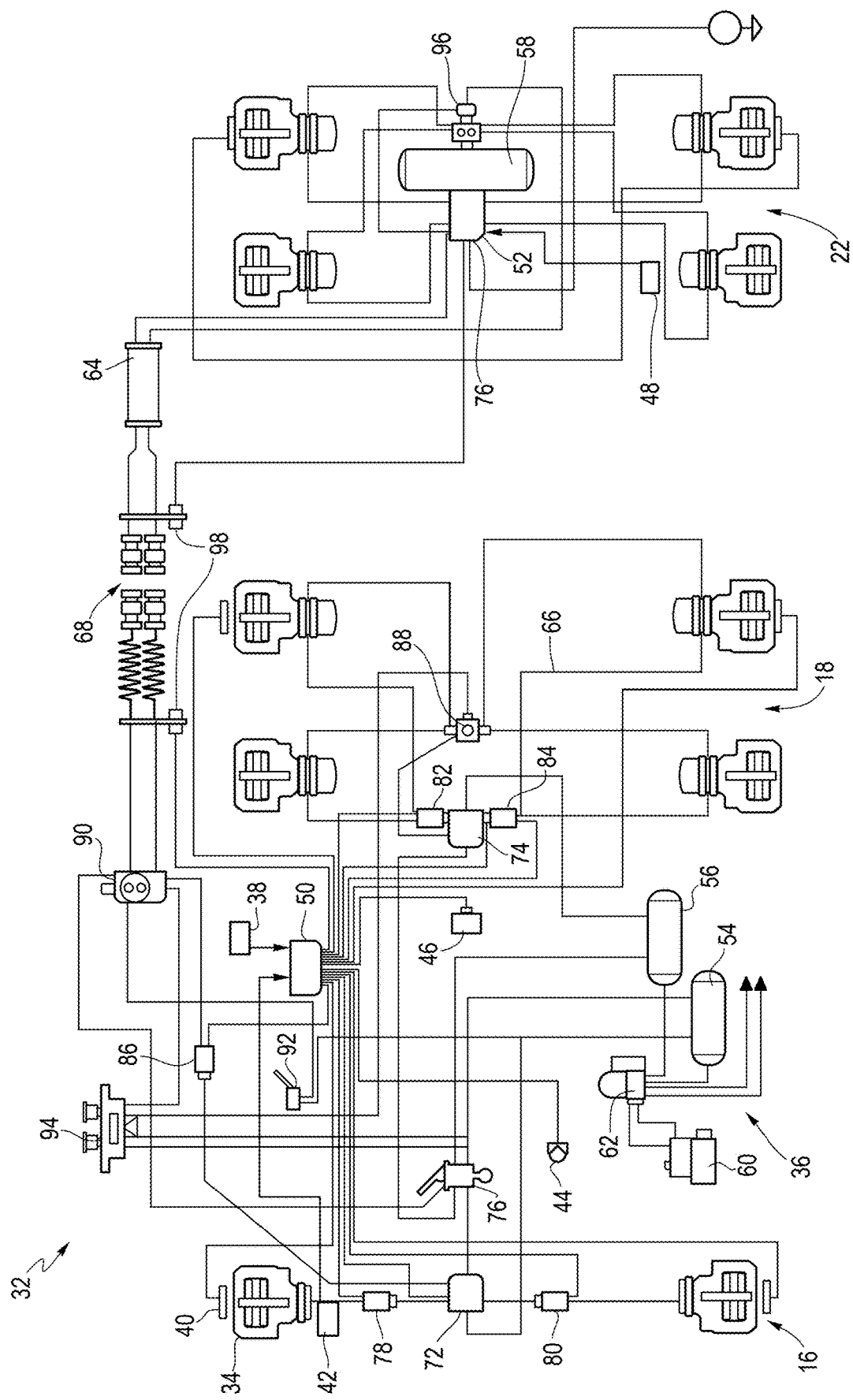
FIG. 2 is a diagrammatic and schematic view of a portion of the tractor-trailer of FIG. 1.

Referring now to FIG. 2, braking system 32 may include wheel brakes 34, a fluid circuit 36 that supplies fluid pressure to wheel brakes 34, various sensors including vehicle speed sensors such as an engine or transmission speed sensor 38 and wheel speed sensors 40, pressure sensors 42, a steer angle sensor 44, a yaw rate sensor 46, and load sensors 48, and one or more controllers 50, 52.

Wheel brakes 34 are configured to apply a braking force to wheels 21. In the illustrated embodiment, brakes 34 comprise disc brakes in which a carrier supports brake pads on opposite sides of a rotor rotating with the wheel 21 and an actuator causes, responsive to fluid pressure delivered by fluid circuit 36, movement of a caliper relative to the carrier to move the brake pads into and out of engagement with the rotor. It should be understood, however, that one or more of wheel brakes 34 may alternatively comprise drum brakes in which an actuator such as a cam or piston causes, responsive to fluid pressure delivered by fluid circuit 36, movement of one or more brake shoes into engagement with a braking surface in a brake drum rotating with wheel 21.

Fluid circuit 36 generates fluid pressure within system 32 and controls the delivery of fluid pressure to the actuator of each wheel brake 34. Circuit 36 may include components for generating and storing pressurized fluid including fluid reservoirs 54, 56, 58, a compressor 60, and air dryers 62, 64 and components for routing and delivering fluid pressure to wheel brakes 34 including fluid conduits 66, glad-hand connectors 68 between tractor 12 and trailer 14, and various valves including foot pedal valve 70, relay valves 72, 74, 76, modulator valves 78, 80, 82, 84, 86, quick release valve 88, tractor protection valve 90, trailer control valve 92, dash control valve 94 and trailer parking control valve 96.

Fluid reservoirs 54, 56, 58 store compressed fluid for use in applying wheel brakes 34. Reservoir 54 supplies pressurized fluid to the wheel brakes for steer axle 16 and has a fluid port coupled to air dryer 62 and fluid ports coupled to relay valve 72. Reservoir 56 supplies pressurized fluid to the wheel brakes for drive axles 18 and has a fluid port coupled to air dryer 62 and fluid ports coupled to relay valve 74. Reservoir 58 supplies pressurized fluid to the wheel brakes for trailer axle 23 has a fluid port coupled to trailer parking control valve 96.

Compressor 60 draws in air and compresses the air for delivery to reservoirs 54, 56 through air dryer 62. Compressor 60 has one or more fluid ports coupled to air dryer 62.

Air dryers 62, 64 are provided to collect and remove solid, liquid and vapor contaminants from pressurized fluid. Air dryer 62 is disposed between compressor 60 and reservoirs 54, 56 and has fluid ports coupled to compressor 60 and each reservoir 54, 56. Air dryer 64 is supported on trailer 14 between glad-hand connectors 68 and relay valve 76 and has fluid ports coupled to glad-hand connectors 68 and relay valve 76. Air dryer 64 assists in removing contaminants from the fluid in situations where tractor 12 lacks an air dryer and/or when trailer 14 becomes disconnected from tractor 12.

Fluid conduits 66 are used to transport fluid between reservoirs 54, 56, 58, compressor 60, air dryers 62, 64, glad-hand connectors 68, valves 70, 72, 74, 76, 78, 80, 82, 84, 86, 88, 90, 92, 94, 96 and wheel brakes 34. Conduits 66 may be made from conventional metals and/or plastics and have connectors at either end configured to join the conduits 66 to corresponding components of circuit 36.

Glad-hand connectors 68 are used to transmit pressurized fluid from tractor 12 to trailer 14. One of connectors 68 supplies system pressure (also referred to as tank pressure) during emergency braking while the other connector 68 delivers control pressure (e.g., driver demand, AEB demand, etc.). Foot pedal valve 70 is provided to allow controlled application of the brakes 34 by the vehicle operator by selectively releasing fluid pressure from fluid reservoirs 54, 56. Valve 70 is supported within the cabin of tractor 12. Actuation of valve 70 by the vehicle operator allows fluid pressure to flow from reservoirs 54, 56 to relay valves 72, 74 and/or tractor protection valve 90 and valve 70 therefore has fluid ports in communication with reservoirs 54, 56 and valves 72, 74, 90.

Relay valves 72, 74, 76 increase the volume of fluid, and therefore the speed, at which fluid is delivered to, and exhausted from, wheel brakes 34 in order to eliminate lag times between the commanded and actual application and release of brakes 34. Relay valve 72 has fluid ports in communication with foot pedal valve 70, reservoir 54 and modulator valves 78, 80, 86. Relay valve 74 has fluid ports in communication with foot pedal valve 70, reservoir 56, modulator valves 82, 84 and quick release valve 88. Relay valve 76 has fluid ports in communication with air dryer 64, trailer parking control valve 96 and each wheel brake 34. Relay valve 76 may be integrated with a modulator valve and controller 52 in some embodiments. Relay valves 72, 74 and 76 may operate under the control of controllers 52, 54 to implement anti-lock braking/traction control when required.

Modulator valves 78, 80, 82, 84, 86 are provided to implement an anti-lock braking function. During normal braking, valves 78, 80, 82, 84, 86 allow fluid pressure to pass from relay valves 72, 74 to wheel brakes 34 without interference. During a loss of traction, however, signals from controller 52 causes valves 78, 80, 82, 84, 86 to modulate the fluid pressure to prevent lockup of the wheels 21. Modulator valves 78, 80 have fluid ports coupled to relay valve 72 and to wheel brakes 34 on steer axle 16. Modulator valves 82, 84 have fluid ports coupled to relay valve 74 and to wheel brakes 34 on drive axle 18. Finally, modulator valve 86 has fluid ports in communication with relay valve 72 and tractor protection valve 90.

Quick release valve 88 increases the speed at which fluid pressure is exhausted from wheel brakes 34 on drive axle 18 when brakes 34 are released. Valve 88 has fluid ports in communication with wheel brakes 34 on drive axle 18 and dash control valve 94.

Tractor protection valve 90 transmits pneumatic signals relating to operation of the trailer wheel brakes 34 from the tractor 12 to the trailer 14. Valve 98 also protects the fluid supply for tractor 12 in the event of a brake in the fluid connection between tractor 12 and trailer 14. Valve 98 has fluid ports in communication with foot pedal valve 70, modulator valve 86, trailer control valve 92, dash control valve 94, and glad-hand connectors 68.

Trailer control valve 92 allows the vehicle operator to control wheel brakes 34 on trailer 14 independent of the wheel brakes 34 on tractor 12. Valve 92 may be mounted within the cab of tractor 12 and permits delivery of fluid directly from reservoir 54 to tractor protection valve 90 for delivery to wheel brakes 34 in trailer 14. Valve 92 has fluid ports in communication with reservoir 54 and tractor protection valve 90.

Dash control valve 94 allows the vehicle operator to implement several functions including releasing parking brakes on tractor 12 or trailer 14 by supplying fluid pressure to oppose spring forces in the actuators for wheel brakes 34. Valve 94 has fluid ports in communication with reservoirs 54, 56, quick release valve 88 and tractor protection valve 90.

Trailer parking control valve 96 is provided to control the parking or emergency braking function of the actuators for the wheel brakes 34 on trailer 14. Valve 96 is mounted directly to reservoir 58. Valve 96 has fluid ports in communication with the reservoir 58, air dryer 64 and wheel brakes 34 on trailer 14.

Engine or transmission speed sensor 38 generates a signal indicative of the speed of tractor-trailer 10. Sensor 38 may comprise one or more magnets configured to track the rotation of a driveshaft or similar component in the drivetrain for tractor 12 and generate signals indicative of the speed of rotation. A controller, such as controller 52 can then determine the speed of tractor-trailer 10 responsive to the signal.

Wheel speed sensors 40 generate signals indicative of the rotational speed of a corresponding wheel 21. Each sensor 40 may include a magnet surrounded by a coil disposed proximate to a toothed ring on a wheel 21. Rotation of the toothed ring causes changes in the direction and intensity of the magnetic fields and is indicative of rotation of the wheel 21. Controllers 50, 52 can determine the rotational speed of each wheel 21 responsive to signals generated by sensors 40. Based on the rotational speed of wheels 21, controllers 50, 52 can determine whether certain wheels 21 are slipping and implement anti-lock braking through control of relay valves 72, 74, 76 and modulator valves 78, 80 82, 84, 86. Controllers 50, 52 can also determine the speed of tractor-trailer 10 responsive to the determined speed of wheels 21.

Pressure sensors 42 generate signals indicative of the fluid pressure at various locations within fluid circuit 36. Although only one pressure sensor 42 is illustrated in FIG. 2, it should be understood that pressure sensors 42 may be located through fluid circuit 36. In accordance with the present teachings, pressure sensors 42 may be used to determine the pressure applied at the wheel brakes 34 for one or more wheels on steer axle 16 or drive axle 18 on tractor 12 for a purpose described below.

Steer angle sensor 44 outputs a signal indicative of a steering angle imparted by a vehicle operator to a steering wheel in tractor 12. Sensor 44 may be mounted on a steering column within tractor 12.

Yaw rate sensor 46 generates a signal indicative of the angular velocity of tractor 12 about its vertical (yaw) axis. An electronic stability control system may compare the output of sensors 44, 46 to determine whether the intended direction of travel for tractor-trailer 10 (as indicated by sensor 44) matches the actual direction of travel (as indicated by sensor 46) and thereby determine whether there has been a loss of traction between the wheels 21 and the road. When the intended and actual directions of tractor-trailer 10 diverge, the system generates control signals for one or both of the vehicle engine and the wheel brakes 34 in order to control the torque at one or more of the wheels 21 so that the actual direction of tractor-trailer 10 will match the intended direction.

Load sensor 48 generates a signal indicative of the forces at a given location. In accordance with one aspect of the present teachings, a load sensor 48 may be used to determine the load on one or more of trailer axles 23 in order to assist in determining the stability of trailer 14 as discussed below. Load sensor 48 may comprise a strain gauge, piezoelectric sensor or a fluid (hydraulic or pneumatic) sensor.

Controllers 50, 52 control the operation of relay valves 72, 74, 76 and modulator valves 78, 80, 82, 84, 86 in order to control the fluid pressure delivered to wheel brakes 34 and, therefore, the braking force applied to wheels 21. Controllers 50, 52 may comprise programmable microprocessors or microcontrollers or may comprise application specific integrated circuits (ASICs). Each controller 50, 52 may include a memory and a central processing unit (CPU). Each controller 50, 52 may also include an input/output (I/O) interface including a plurality of input/output pins or terminals through which the controller 50, 52 may receive a plurality of input signals and transmit a plurality of output signals. The input signals may include signals received from controller 28 in system 24 and from sensors 40, 42, 44, 46, 48. The output signals may include signals used to control relay valves 72, 74, 76, and modulator valves 78, 80, 82, 84, 86. In the illustrated embodiment, tractor 12 and trailer 14 include separate controllers 50, 52 that may communicate with one another across an electrical connector between tractor 12 and trailer 14. It should be understood, however, that the functionality of controllers 50, 52 could be combined into a single controller or further sub-divided among multiple sub-controllers. In accordance with the present teachings, one or both of controllers 50, 52 may be configured with appropriate programming instructions (i.e., software or a computer program) to implement several steps in a method for controlling the wheel brakes 34 on each trailer 14 as described below.

During a high-pressure demand braking operation from an automated system (for example, AEB-initiated braking) in a tractor-trailer 10 with associated sensors and systems such as disclosed in FIGS. 1 and 2, it is desirable to maximize trailer braking on high friction (high-mu) surfaces and avoid trailer swing that can occur on low friction (low-mu) surfaces. In one embodiment, in order to address this need in real-time without the need for any ABS data from the trailer 14, the system of FIGS. 1 and 2 is configured to estimate available surface friction (mu) based on a percentage reduction in demanded pressure caused by the tractor ABS, without regard to any ABS data from the trailer, and without regard to whether the trailer has ABS. While operating at a tire-road adhesion limit, a demanded service pressure, calculated by the tractor brake controller based on the deceleration demand from an automated external braking system such as AEB, is lowered to an ABS limit pressure determined by the maximum available traction.

The difference between demanded service pressure and the tractor ABS limit pressure may be used to obtain the percent reduction of service brake pressure during ABS. More particularly, the percent reduction of service break pressure=(demanded service pressure−ABS limit pressure)/demanded service pressure. When demanded service pressure is high, for example during AEB events, the percent reduction of service brake pressure during ABS will always be higher than a threshold (e.g. 50%) on low-mu surfaces, and will be lower than that threshold on high-mu surfaces. Since percent reduction of service brake pressure during ABS is calculated in real-time as vehicle is moving, it provides up-to-date information on surface-mu at each sensed wheel-end of the tractor during AEB. Additionally, percent reduction of service brake pressure can be utilized to detect any of following types of low-mu surfaces: low-mu on all wheels, split-mu (low-mu on one side), mu-transition (all wheels from high-mu to low-mu, and vice-versa). As a result, by utilizing a predetermined threshold the brake controller can request maximum trailer braking during AEB on high-mu surfaces, and pulsed trailer braking during AEB on any of the aforementioned low-mu surfaces to mitigate trailer swing on low-mu surfaces. As noted above, the ABS information being used to determine whether to apply a high or low pressure to the trailer brakes is only the ABS information determined from the wheels of the tractor of the vehicle.

Figure 3:
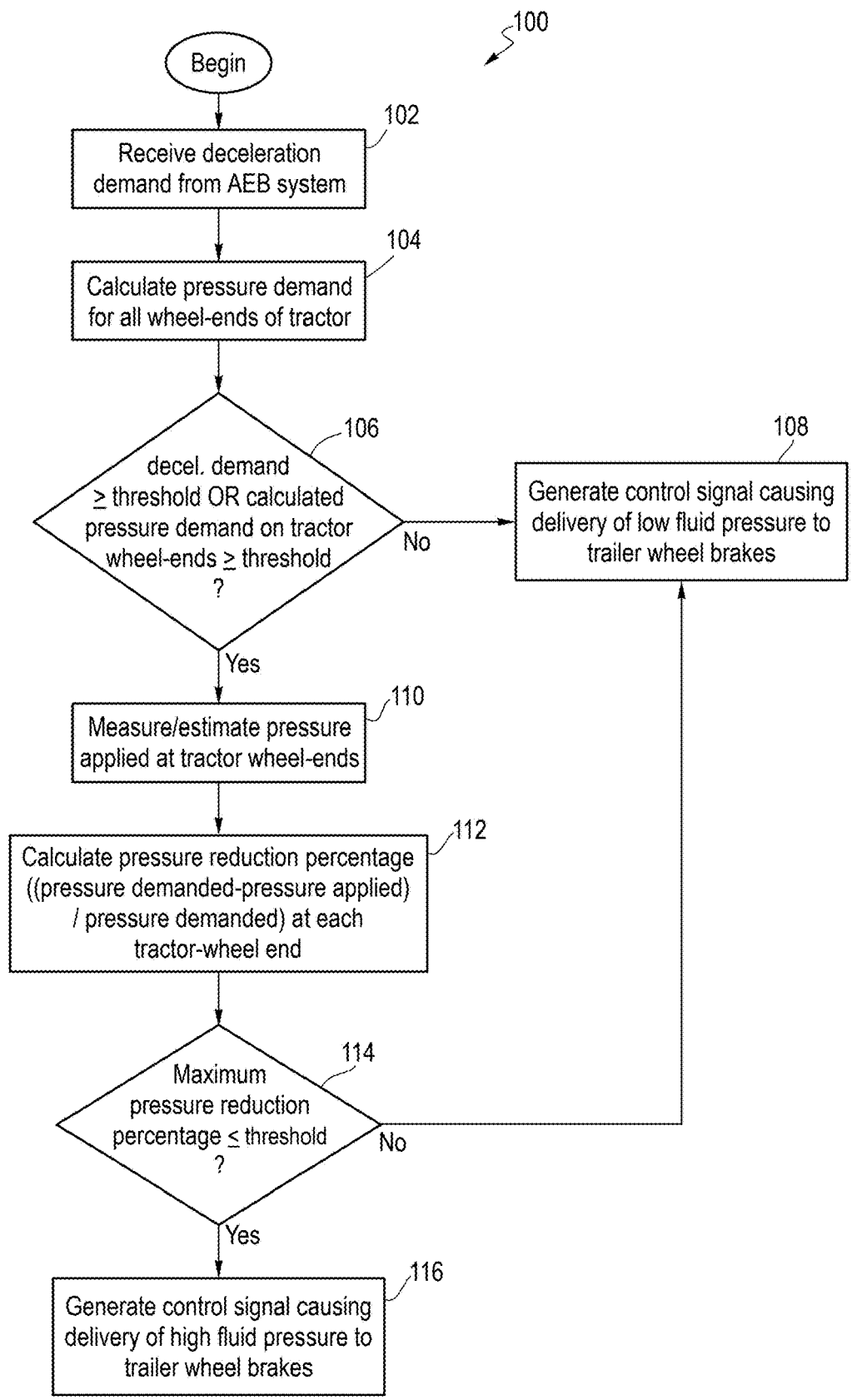
FIG. 3 is flow chart illustrating several steps in a method for controlling wheel brakes on the trailer of a tractor-trailer in accordance with one embodiment of the present teachings.

Referring to FIG. 3, one implementation of a method 100 of maximizing trailer braking during a high-pressure demand event is illustrated. The process may start upon receipt of a deceleration demand from an automated system, such as the AEB system of the vehicle (act 102). The deceleration demand may be triggered by the sensors (e.g. lidar, radar, cameras, etc.) on the vehicle used by the AEB system based on the particular collision avoidance settings for the specific AEB system. Any of a number of known AEB systems may be utilized. Once an AEB deceleration demand is received, the brake controller calculates a pressure demand for all wheel-ends of the tractor to achieve the desired collision avoidance/reduction (act 104). The AEB deceleration demand may be in the form of an acceleration amount (in meters/second$^2$) the AEB system wants the vehicle to act on. The tractor brake controller will convert that demand into a necessary pressure for the vehicle to achieve that deceleration. The brake controller for the tractor will then compare the AEB deceleration demand to a deceleration demand threshold or may instead compare the calculated pressure demand resulting from that AEB deceleration demand to a pressure demand threshold (act 106). In other embodiments, the tractor brake controller may compare both the deceleration demand and the calculated pressure demand to their respective thresholds. When the deceleration demand is at or above the deceleration demand threshold, or when the calculated pressure demand on the tractor wheel-ends is at or above the pressure demand threshold, the brake controller generates a control signal to deliver a low fluid pressure to the trailer wheel brakes of any trailer connected to the tractor (act 108). In one implementation, the deceleration demand threshold may be 3 m/s$^2$ and the pressure demand threshold may be 4 bar (i.e., 400 kPa). The deceleration demand threshold and pressure demand threshold are fixed thresholds that may be different amounts in different implementations. These threshold amounts may be set at the time of manufacture of the vehicle. Additionally, in one embodiment, the first and second control signals generated by the brake controller of the tractor are communicated to the trailer or trailers via a mass transmission over air lines (e.g., a pneumatic signal indicative of the low or high pressure to be applied by the trailer based on the tractor calculations) between the tractor and trailer.

Conversely, when either the deceleration demand or the calculated pressure demand on the tractor wheel-ends is above the pressure demand threshold, the brake controller measures or estimates the pressure applied at the tractor wheel-ends (act 110). The brake controller then uses the measured or estimated pressure applied at the tractor wheel-ends to calculate a pressure reduction percentage. The ABS on the tractor, when ABS is triggered and in operation, will pulse the brake pressure applied to the wheel-ends on the tractor, so ABS effectively reduces the average pressure applied to the wheel-ends. As noted above, a pressure reduction percentage may be calculated as: percent reduction of service brake pressure=(demanded service pressure−measured/estimated pressure (also referred to as ABS limit pressure))/demanded service pressure. Thus, using the measure/estimated pressure applied at the tractor wheel-ends, the brake controller calculates this pressure reduction percentage (act 112). The brake controller then compares that calculated pressure reduction percentage to a predetermined threshold percentage (act 114).

In one implementation, the predetermined threshold percentage is determined at the time of tractor manufacture and may be, for example, 50%. Other predetermined threshold percentages may be factory selected based on particular performance characteristics of the type/model of tractor. When the pressure reduction percentage is greater than the predetermined threshold percentage, the brake controller will initiate generation of a control signal to cause delivery of low fluid pressure to trailer wheel brakes (act 108). Otherwise, when the pressure reduction percentage is less than or equal to the predetermined threshold, the brake controller will initiate generation of a control signal to cause delivery of high fluid pressure to trailer wheel brakes (act 116).

The trailer brake pressure maximization process of FIG. 3 may be continuously performed and updated for the duration of the high demand braking event, such as an AEB event. The ABS data from only the tractor provides the necessary data to allow the process to proceed in real-time to generate high brake pressure and low brake pressure control signals for transmission to the one or more trailers connected with the tractor. The control signals generated by the tractor brake controller for causing a high pressure or low pressure fluid delivery in the trailer brakes may be generated in a PLC format for communication over the power line connecting the tractor to the trailer or trailers.

In summary, this embodiment provides a braking system able to use only tractor ABS data, without using any trailer ABS data or tractor-trailer velocity data, to help maximize brake pressure applied to the trailer wheel ends during an automated braking operation such as AEB. This can be accomplished by using the tractor ABS data to effectively estimate whether the trailer is on a low-mu or high-mu surface and control whether a high brake pressure command can be sent to the trailer (when a high-mu surface is assumed based on tractor ABS and demanded pressure from the automated braking system) or a low brake pressure command is called for (when a low-mu surface is detected based on tractor ABS and demanded pressure).

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A brake system in a tractor, the brake system comprising:
   a brake controller configured to:
      receive a deceleration demand from an automated system of the tractor;
      determine a pressure demand for all wheel-ends of the tractor;
      when the received deceleration demand is greater than or equal to a deceleration demand threshold or the determined pressure demand is greater than or equal to a predetermined pressure demand threshold:
         determine a pressure applied at each wheel-end of the tractor;
         calculate a pressure reduction percentage at each wheel-end of the tractor;
         when a maximum calculated pressure reduction is less than a predetermined pressure reduction threshold:
            generate a first control signal to cause delivery of high fluid pressure to wheel brakes of a trailer to the tractor; and when the maximum calculated pressure reduction is greater than or equal to the predetermined pressure reduction threshold:
generate a second control signal to cause delivery of low fluid pressure to wheel brakes of the trailer to the tractor.

2. The brake system of claim 1, wherein the brake controller is further configured to determine the maximum calculated pressure reduction by:
calculating a pressure reduction percentage according to the relation: pressure reduction percentage=((deceleration demand−pressure applied)/pressure demand) at each tractor-wheel end, where pressure applied comprises an amount of pressure applied to a tractor wheel-end as a result of anti-lock braking system (ABS) operation in the tractor; and
selecting, as the maximum calculated pressure reduction, a highest pressure reduction percentage calculated for any of the tractor wheel-ends.

3. The brake system of claim 1, wherein the brake controller is further configured to:
when the received deceleration demand is less than the deceleration demand threshold or the determined pressure demand is less than the predetermined pressure demand threshold, generate the second control signal to cause delivery of low fluid pressure to wheel brakes of the trailer to the tractor.

4. The brake system of claim 1, wherein the brake controller is configured to transmit the generated control signal or the generated second control signal to a trailer with a pneumatic signal.

5. The brake system of claim 1, wherein the automated system of the tractor is an automated emergency braking (AEB) system.

6. The brake system of claim 5, wherein the brake controller is configured to, during a duration of the deceleration demand from the AEB system of the tractor, continuously determine the maximum calculated pressure reduction of the wheel-ends of the tractor and adjust between generation of the first control signal and the second control signal based on a current maximum calculated pressure demand.

7. The brake system of claim 1, wherein the predetermined pressure reduction threshold is 50%.

8. A method for maximizing braking pressure in tractor-trailers comprising:
in a brake controller of a tractor:
receiving a deceleration demand from an automated system of the tractor;
determining a pressure demand for all wheel-ends of the tractor;
when the received deceleration demand is greater than or equal to a deceleration demand threshold or the determined pressure demand is greater than or equal to a predetermined pressure demand threshold:
determining a pressure applied at each wheel-end of the tractor;
calculating a pressure reduction percentage at each wheel-end of the tractor;
when a maximum calculated pressure reduction is less than a predetermined pressure reduction threshold:
generating a first control signal to cause delivery of high fluid pressure to wheel brakes of a trailer to the tractor; and when the maximum calculated pressure reduction is greater than or equal to the predetermined pressure reduction threshold:
generating a second control signal to cause delivery of low fluid pressure to wheel brakes of the trailer to the tractor.

9. The method of claim 8, further comprising the brake controller:
determining the maximum calculated pressure reduction by calculating a pressure reduction percentage according to the relation: pressure reduction percentage= ((deceleration demand−pressure applied)/pressure demand) at each tractor-wheel end, where pressure applied comprises an amount of pressure applied to a tractor wheel-end as a result of anti-lock braking system (ABS) operation in the tractor; and
selecting, as the maximum calculated pressure reduction, a highest pressure reduction percentage calculated for any of the tractor wheel-ends.

10. The method of claim 8, further comprising the brake controller:
generating the second control signal to cause delivery of low fluid pressure to wheel brakes of the trailer to the tractor when the received deceleration demand is less than the deceleration demand threshold or the determined pressure demand is greater than the predetermined pressure demand threshold.

11. The method of claim 8, further comprising the brake controller transmitting the generated control signal or the generated second control signal to a trailer with a pneumatic signal.

12. The method of claim 8, wherein receiving the deceleration demand from the automated system of the tractor comprises receiving the deceleration demand from an automated emergency braking (AEB) system.

13. The method of claim 12, further comprising the brake controller, during a duration of the deceleration demand from the AEB system of the tractor, continuously determining the maximum calculated pressure reduction of the wheel-ends of the tractor and adjusting between generation of the first control signal and the second control signal based on a current maximum calculated pressure demand.

14. The method of claim 8, wherein the predetermined pressure reduction threshold is 50%.

15. A non-transitory computer readable storage medium comprising processor executable instructions for maximizing braking pressure in a tractor-trailer brake system, the processor executable instructions comprising instructions for causing a brake controller of a tractor to:
receive a deceleration demand from an automated system of the tractor;
determine a pressure demand for all wheel-ends of the tractor;
when the received deceleration demand is greater than or equal to a deceleration demand threshold or the determined pressure demand is greater than or equal to a predetermined pressure demand threshold:
determine a pressure applied at each wheel-end of the tractor;
calculate a pressure reduction percentage at each wheel-end of the tractor;
when a maximum calculated pressure reduction is less than a predetermined pressure reduction threshold:
generate a first control signal to cause delivery of high fluid pressure to wheel brakes of a trailer to the tractor; and when the maximum calculated pressure reduction is greater than or equal to the predetermined pressure reduction threshold:
  generate a second control signal to cause delivery of low fluid pressure to wheel brakes of the trailer to the tractor.

16. The non-transitory computer readable storage medium of claim 15, the processor executable instructions further comprising instructions for causing the brake controller of the tractor to determine the maximum calculated pressure reduction by:
  calculating a pressure reduction percentage according to the relation: pressure reduction percentage=((deceleration demand−pressure applied)/pressure demand) at each tractor-wheel end, where pressure applied comprises an amount of pressure applied to a tractor wheel-end as a result of anti-lock braking system (ABS) operation in the tractor; and
  selecting, as the maximum calculated pressure reduction, a highest pressure reduction percentage calculated for any of the tractor wheel-ends.

17. The non-transitory computer readable storage medium of claim 15, wherein the processor executable instructions further comprise instructions for causing the brake controller of the tractor to, when the received deceleration demand is less than the deceleration demand threshold or the determined pressure demand is greater than the predetermined pressure demand threshold, generate the second control signal to cause delivery of low fluid pressure to wheel brakes of the trailer to the tractor.

18. The non-transitory computer readable storage medium of claim 15, wherein the processor executable instructions further comprise instructions for causing the brake controller of the tractor to transmit the generated control signal or the generated second control signal to a trailer with a pneumatic signal.

19. The non-transitory computer readable storage medium of claim 15, wherein the processor executable instructions for causing the brake controller of the tractor to receiving the deceleration demand from the automated system of the tractor comprises instructions for receiving the deceleration demand from an automated emergency braking (AEB) system.

20. The non-transitory computer readable storage medium of claim 19, wherein the processor executable instructions further comprise instructions for causing the brake controller of the tractor to, during a duration of the deceleration demand from the AEB system of the tractor, continuously determine the maximum calculated pressure reduction of the wheel-ends of the tractor and adjust between generation of the first control signal and the second control signal based on a current maximum calculated pressure demand.

* * * * *